United States Patent
Jiao et al.

(10) Patent No.: US 8,787,482 B2
(45) Date of Patent: Jul. 22, 2014

(54) METHOD AND SYSTEM FOR SELECTING PRE-CODING MATRIX IN CLOSED LOOP MULTI-INPUT MULTI-OUTPUT SYSTEM

(75) Inventors: Li Jiao, Shenzhen (CN); Chunfeng Yao, Shenzhen (CN); Juan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 84 days.

(21) Appl. No.: 13/635,905

(22) PCT Filed: May 13, 2010

(86) PCT No.: PCT/CN2010/072747
§ 371 (c)(1),
(2), (4) Date: Sep. 18, 2012

(87) PCT Pub. No.: WO2011/116542
PCT Pub. Date: Sep. 29, 2011

(65) Prior Publication Data
US 2013/0010896 A1    Jan. 10, 2013

(30) Foreign Application Priority Data

Mar. 22, 2010 (CN) .......................... 2010 1 0134216

(51) Int. Cl.
*H04B 7/02* (2006.01)
*H04B 7/04* (2006.01)
*H04L 1/00* (2006.01)
*H04B 7/06* (2006.01)

(52) U.S. Cl.
CPC ............ *H04B 7/0456* (2013.01); *H04B 7/0417* (2013.01); *H04L 1/0003* (2013.01); *H04L 1/0009* (2013.01); *H04B 7/0639* (2013.01); *Y02B 60/31* (2013.01)
USPC ....................................... 375/267

(58) Field of Classification Search
CPC .. H04B 7/0417; H04B 7/0456; H04B 7/0639; H04L 1/0003; H04L 1/0009; Y02B 60/31
USPC ................ 375/260, 267, 285, 295, 296, 299; 370/204, 252, 328, 329
See application file for complete search history.

(56) References Cited

U.S. PATENT DOCUMENTS

| | | | |
|---|---|---|---|
| 2008/0075027 | A1 | 3/2008 | Lee et al. |
| 2008/0232503 | A1* | 9/2008 | Kim ............................... 375/267 |
| 2010/0103810 | A1* | 4/2010 | Kloos et al. .................... 370/204 |
| 2010/0254474 | A1* | 10/2010 | Gomadam et al. ............. 375/267 |
| 2011/0149765 | A1* | 6/2011 | Gorokhov et al. ............. 370/252 |
| 2011/0268067 | A1* | 11/2011 | Seo et al. ....................... 370/329 |
| 2012/0057657 | A1* | 3/2012 | Khojastepour et al. ........ 375/340 |

FOREIGN PATENT DOCUMENTS

| | | |
|---|---|---|
| CN | 1933609 A | 3/2007 |
| CN | 101207461 A | 6/2008 |
| CN | 101346903 A | 1/2009 |
| CN | 101453259 A | 6/2009 |
| CN | 101510820 A | 8/2009 |
| CN | 101651533 A | 2/2010 |
| JP | 2008543215 A | 11/2008 |
| JP | 2009111781 A | 5/2009 |
| JP | 2009189007 A | 8/2009 |
| JP | 2010501136 A | 1/2010 |
| WO | 2008096997 A2 | 8/2008 |
| WO | 2009023681 A2 | 2/2009 |
| WO | 2009120048 A2 | 10/2009 |

OTHER PUBLICATIONS

International Search Report on international application No. PCT/CN2010/072747, mailed on Dec. 30, 2010.
English Translation of the Written Opinion of the International Search Authority in international application No. PCT/CN2010/072747, mailed on Dec. 30, 2010.

* cited by examiner

*Primary Examiner* — Sam K Ahn
*Assistant Examiner* — Syed Haider
(74) *Attorney, Agent, or Firm* — Oppedahl Patent Law Firm LLC

(57) ABSTRACT

A method and a system for selecting a pre-coding matrix in a closed loop MIMO system are provided. The method includes: traversing all pre-coding matrices and respectively calculating a CINR corresponding to each pre-coding matrix; and obtaining an MCS according to a CINR corresponding to a pre-coding matrix, calculating a spectral efficiency corresponding to the MCS, and selecting a pre-coding matrix with a largest spectral efficiency. According to the method and system provided by the present disclosure, an appropriate pre-coding matrix can be selected. By using the appropriate pre-coding matrix in the closed loop MIMO system, the channel quality, the throughput of a closed loop multiplexing system in the scenario that the channel changes slowly, and the gain can be improved. Besides, the method of the present disclosure can avoid calculation of the BER formula on the premise of a large number of assumptions, and reduce the computation complexity.

11 Claims, 2 Drawing Sheets

METHOD AND SYSTEM FOR SELECTING PRE-CODING MATRIX IN CLOSED LOOP MULTI-INPUT MULTI-OUTPUT SYSTEM

TECHNICAL FIELD

The present disclosure relates to the field of communications, and more particularly to a method and a system for selecting a pre-coding matrix in a closed loop Multi-Input Multi-Output (MIMO) system.

BACKGROUND

MIMO is one of the most important technologies for realizing a high data rate required in a radio data system. Data streams can be transmitted via MIMO so as to improve the system throughput. Currently, MIMO is applied to most 3G and 4G radio standards, e.g. World interoperability for Microwave Access (WiMAX) technology, Time Division-Synchronous Code Division Multiple Access (TD-SCDMA) and Long Term Evolution (LTE) technology.

The transmission schemes of the MIMO system are mainly classified as two types: open-loop MIMO system and closed-loop MIMO system. A closed-loop MIMO system feeds channel information at a receiver back to a transmitter and then performs operations such as pre-coding and beam-forming on the transmission data. But reciprocating communication is not performed by a receiver and a transmitter in an open-loop MIMO system, thus channel information cannot be fully utilized. In a scenario that a channel changes slowly, a closed-loop pre-coding MIMO system needs to improve the system performance by using the fed-back channel information. Since a feedback link occupies the system overhead, in a practical system, a partial feedback technology is used to allocate a limited feedback channel between a mobile phone and a base station to feed back important information of the channel and realize multiplexing technology. In order to reduce the signaling overhead of a reverse link and the feedback information of a pre-coding system, an LTE system adopts a codebook-based pre-coding technology to improve the spectral efficiency of a system. For an LTE closed-loop MIMO system, a pre-coding matrix and a corresponding index value are specified in a protocol. A receiver selects an optimal pre-coding matrix according to a certain criterion and feeds a Precoding Matrix Indicator (PMI) back to a transmitter which then obtains the pre-coding matrix according to the PMI and performs pre-coding on transmission signals.

Criteria for estimating PMI in the existing closed-loop MIMO system include the Minimum Mean Squared Error (MMSE) matrix trace criterion, the maximum channel capacity criterion and the optimal Bit Error Rate (BER) selection criterion etc.

In a non-singular case, the gain of a closed loop is not large than that of an open loop according to the MMSE matrix trace criterion; a calculated theoretical channel capacity can not be actually achieved and there is no gain in the Frame Error Rate (FER) performance according to the maximum channel capacity criterion; while the optimal BER selection criterion is equivalent to the maximum throughput criterion and has a shortcoming that its calculation formula is obtained on the premise of a large number of assumptions. Therefore, the existing pre-coding matrix selecting methods have some disadvantages.

SUMMARY

The present disclosure provides a method for selecting a pre-coding matrix in a closed loop MIMO system, which is able to select an appropriate pre-coding matrix.

The present disclosure adopts the following technical solution:

According to an aspect, the present disclosure discloses a method for selecting a pre-coding matrix in a closed loop MIMO system. The method includes the following steps:

A. traversing all pre-coding matrices and respectively calculating a Carrier to Interference Noise Ratio (CINR) corresponding to each pre-coding matrix;

B. obtaining a Modulation Coding Scheme (MCS) according to a CINR corresponding to a pre-coding matrix, calculating a spectral efficiency corresponding to the MCS, and selecting a pre-coding matrix with a largest spectral efficiency.

In the method for selecting a pre-coding matrix in a closed loop MIMO system, Step B may include:

B1. mapping CINRs to MCS initial values (MCSinits) according to a CINR-MCSinit mapping relation table, and filtering the MCSinits;

B2. calculating a modification value ΔMCS of a filtered MCSinit;

B3. modifying the filtered MCSinit with the modification value ΔMCS to obtain an MCS;

B4. calculating a spectral efficiency corresponding to the MCS, selecting the pre-coding matrix with the largest spectral efficiency, converting the MCS into a corresponding Channel Quality Indicator (CQI), and recording a Rank (RI) corresponding to the selected pre-coding matrix.

In the method for selecting a pre-coding matrix in a closed loop MIMO system, the method may further include: after Step B4, reporting a CQI, a Pre-coding Matrix Indicator (PMI) and the RI corresponding to the pre-coding matrix with the largest spectral efficiency.

In the method for selecting a pre-coding matrix in a closed loop MIMO system, in Step B1, the MCSinits may be filtered according to the following way:

if the MCSinits after mapping are the same, then selecting any one of the MCSinits;

if the MCSinits after mapping are different, then the MCSinits are filtered according to the following way:

in the case of a single data stream, selecting an MCSinit which corresponds to a higher CINR;

in the case of double data streams, selecting an MCSinit which corresponds to a higher sum of CINRs, and if the sums of the CINRs corresponding to the MCSinit are equal, then selecting an MCSinit in which there is a smaller difference between corresponding CINRs.

Filtering the MCSinits in Step B1 may further include: in the case that multiple PMI throughputs or multiple spectral efficiencies are the same, selecting an MCSinit with a smaller RI preferentially; if RIs are the same and RI=1, then selecting an MCSinit with a larger CINR; if RI is larger than 1, then selecting an MCSinit in which there is a smaller difference between CINRs of the two code streams preferentially; and if all CINR differences of the two code streams are the same, then selecting any one of the MCSinits.

In the method for selecting a pre-coding matrix in a closed loop MIMO system, the modification value ΔMCS in Step B2 may be obtained according to the following way:

B21. determining an initial value of ΔMCS, a maximum value of ΔMCS, a minimum value of ΔMCS, an upper limit value of Block Error Rate (BLER) and a lower limit value of BLER;

B22. if the BLER is lower than the lower limit value for N consecutive times, then adding 1 to ΔMCS, wherein the ΔMCS does not exceed the determined maximum value of ΔMCS; if the BLER is higher than the upper limit value for M consecutive times, then deducting 1 from ΔMCS, wherein ΔMCS is not smaller than the determined minimum value of ΔMCS; in other cases, ΔMCS remains unchanged.

In the method for selecting a pre-coding matrix in a closed loop MIMO system, the modified MCS value in Step B3 may be calculated according to the following way: adding up the ΔMCS and the MCSinit, wherein a range of the MCS is restricted within a range specified in an LTE protocol.

According to another aspect, the present disclosure further discloses a system for selecting a pre-coding matrix in a closed loop MIMO system, including a CINR calculating module and an MCS calculating module, wherein the CINR calculating module is configured to traverse all pre-coding matrices and respectively calculate a CINR corresponding to each pre-coding matrix;

the MCS calculating module is configured to obtain an MCS according to a CINR corresponding to a pre-coding matrix, calculate a spectral efficiency corresponding to the MCS, and select a pre-coding matrix with a largest spectral efficiency.

In the system for selecting a pre-coding matrix in a closed loop MIMO system which is disclosed by the present disclosure, the MCS calculating module may include a mapping and filtering sub-module, a ΔMCS calculating sub-module, a modifying sub-module and a selecting sub-module, wherein the mapping and filtering sub-module may be configured to, according to a CINR-MCSinit mapping relation table, map CINRs to MCS initial values (MCSinits) and filter the MCSinits;

the ΔMCS calculating sub-module may be configured to calculate a modification value ΔMCS of a filtered MCSinit;

the modifying sub-module may be configured to modify the filtered MCSinit with ΔMCS to obtain an MCS;

the selecting sub-module may be configured to calculate a spectral efficiency corresponding to the MCS, select the pre-coding matrix with the largest spectral efficiency, convert the MCS into a corresponding Channel Quality Indicator (CQI), and record a Rank (RI) corresponding to the selected pre-coding matrix.

In the system for selecting a pre-coding matrix in a closed loop MIMO system which is disclosed by the present disclosure, the MCS calculating module may further include a reporting sub-module configured to report a CQI, a PMI and the RI corresponding to the pre-coding matrix with the largest spectral efficiency.

In the system for selecting a pre-coding matrix in a closed loop MIMO system which is disclosed by the present disclosure, the mapping and filtering sub-module may be further configured to: if the MCSinits after mapping are the same, select any one of the MCSinits; and further configured to: if the MCSinits after mapping are different, in the case of a single data stream, select an MCSinit which corresponds to a higher CINR, while in the case of double data streams, select an MCSinit which corresponds to a higher sum of CINRs, and if the sums of the CINRs corresponding to the MCSinit are equal, select an MCSinit in which there is a smaller difference between corresponding CINRs.

The mapping and filtering sub-module may be further configured to: in the case that multiple PMI throughputs or multiple spectral efficiencies are the same, select an MCSinit with a smaller RI preferentially; if RIs are the same and RI=1, select an MCSinit with a larger CINR; if RI is larger than 1, select an MCSinit in which there is a smaller difference between CINRs of the two code streams preferentially; and if all CINR differences of the two code streams are the same, select any one of the MCSinits.

The modifying sub-module may be further configured to: determine an initial value of ΔMCS, a maximum value of ΔMCS, a minimum value of ΔMCS, an upper limit value of Block Error Rate (BLER) and a lower limit value of BLER;

if the BLER is lower than the lower limit value for N consecutive times, add 1 to ΔMCS and ΔMCS does not exceed the determined maximum value of ΔMCS; if the BLER is higher than the upper limit value for M consecutive times, deduct 1 from ΔMCS and ΔMCS is not smaller than the determined minimum value of ΔMCS; in other cases, ΔMCS remains unchanged.

Compared with existing technologies, the present disclosure has the following advantageous effects:

The present disclosure calculates a CINR of a pre-coding matrix to obtain an MCS, and then calculates a corresponding spectral efficiency so as to select an appropriate pre-coding matrix. By using the pre-coding matrix in the closed loop multi-input multi-output system, the channel quality, the throughput of a closed loop multiplexing system in the scenario that the channel changes slowly, and the gain can be improved. Besides, the method of the present disclosure can avoid calculation of the BER formula on the premise of a large number of assumptions, and reduce the computation complexity.

DETAILED DESCRIPTION

The present disclosure is further described in details below with reference to the accompanying drawings and embodiments.

The present disclosure discloses a method for selecting a pre-coding matrix in a closed loop MIMO system, including the following steps:

A. traversing all pre-coding matrices and respectively calculating their corresponding Carrier to Interference Noise Rations (CINRs);

B. obtaining a Modulation Coding Scheme (MCS) according to a CINR corresponding a pre-coding matrix, calculating a spectral efficiency corresponding to the MCS, and selecting a pre-coding matrix with a largest spectral efficiency.

Figure 1:
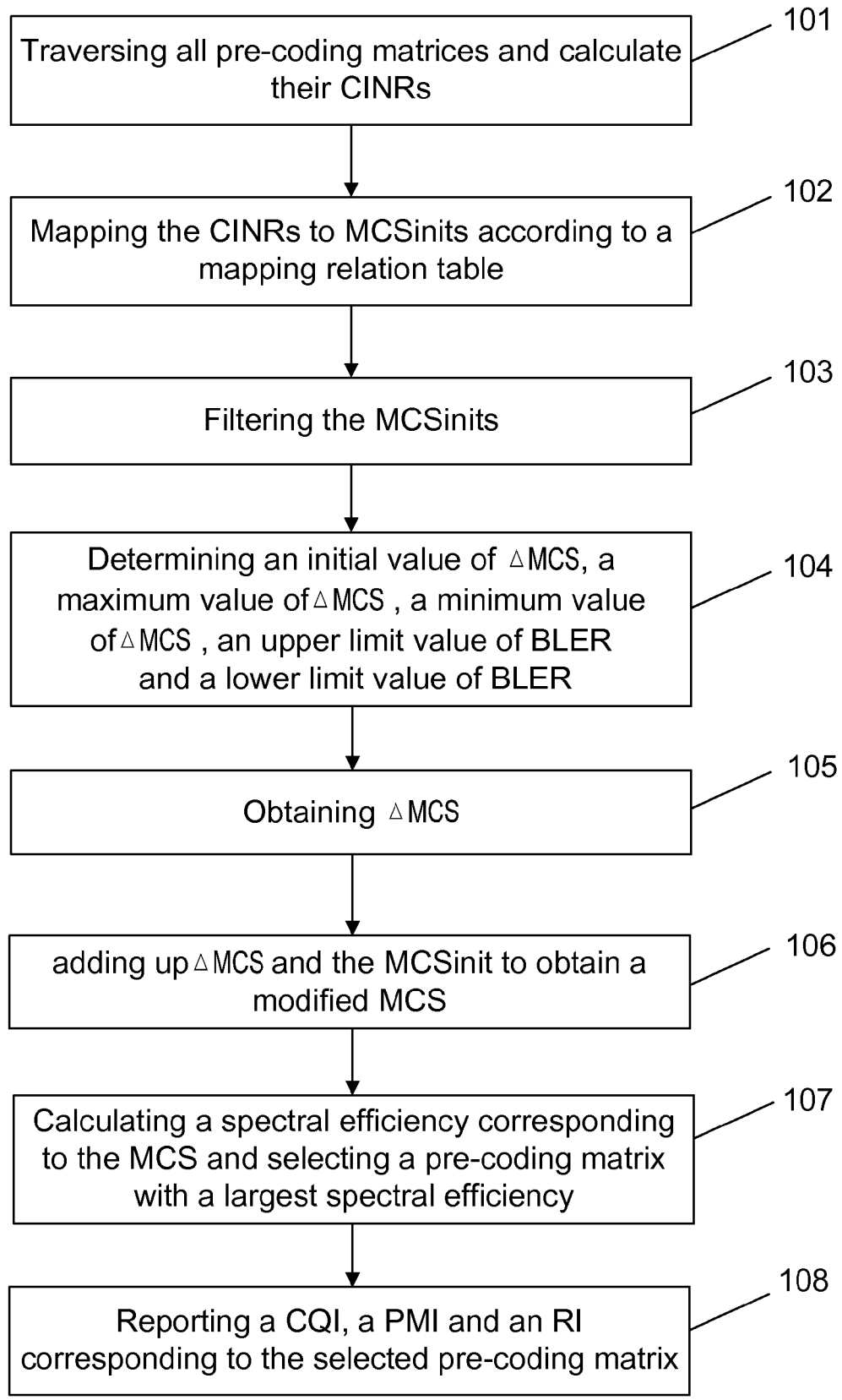
FIG. 1 exemplarily illustrates a flowchart of selecting a pre-coding matrix in the present disclosure.

As shown in FIG. 1, there are two code streams in a dual-input dual-output closed loop MIMO system according to an embodiment of the present disclosure, and a method for selecting a pre-coding matrix includes the following steps:

Step 101: traversing all pre-coding matrices and respectively calculate their corresponding CINRs.

For closed-loop spatial multiplexing with rank (number of layers) of R, the formula for calculating the CINR of the $i^{th}$ (i=1 ... R) layer is described as follows:

$$CINR_i = \frac{|(GHW)_{ii}|^2}{\sum_{j \neq i} |(GHW)_{ij}|^2 + \sigma^2 \sum |(G)_{ij}|^2}$$

where $G=(W^H H^H HW+R_n)^{-1} W^H H^H$ for a MMSE (Minimum Mean Squared Error) receiver;

H represents a channel matrix and is obtained via channel estimation;

W is a pre-coding matrix and is obtained from a codebook in Table 1 which shows the pre-coding matrices:

TABLE 1

| Codebook index | Number of layers υ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

$\sigma^2$ is a constant value which can be obtained by a noise variance; and $R_n$ is a diagonal matrix formed by the noise variance.

In the case of a single code stream, CINR0, CINR1, CINR2 and CINR3 are respectively obtained through a pre-coding matrix whose number of layers is 1. In the case of double code streams, CINR11 and CINR12 of code stream 1, and CINR21 and CINR22 of code stream 2 are respectively obtained through a pre-coding matrix whose number of layers is 2. It is specified in an LTE protocol that the codebook numbered 0 is in a pre-coding matrix whose number of layers is 2 cannot be used in a closed loop, thus the codebook numbering 0 does not take part in CINR calculation.

Step 102: according to a CINR-MCSinit mapping relation table, mapping the CINRs to MCS initial values (MCSinits).

The CINR-MCSinit mapping relation table is as shown in Table 2:

TABLE 2

| MCSinit (i) | CINR |
|---|---|
| 0 | CINR<CINR_MCS0 |
| 1 | CINR_MCS0=<CINR<CINR_MCS1 |
| 2 | CINR_MCS1=<CINR<CINR_MCS2 |
| 3 | CINR_MCS2=<CINR<CINR_MCS3 |
| 4 | CINR_MCS3=<CINR<CINR_MCS4 |
| 5 | CINR_MCS4=<CINR<CINR_MCS5 |
| 6 | CINR_MCS5=<CINR<CINR_MCS6 |
| 7 | CINR_MCS6=<CINR<CINR_MCS7 |
| 8 | CINR_MCS7=<CINR<CINR_MCS8 |
| 9 | CINR_MCS8=<CINR<CINR_MCS9 |
| 10 | CINR_MCS9=<CINR<CINR_MCS10 |
| 11 | CINR_MCS10=<CINR<CINR_MCS11 |
| 12 | CINR_MCS11=<CINR<CINR_MCS12 |
| 13 | CINR_MCS12=<CINR<CINR_MCS13 |
| 14 | CINR_MCS13=<CINR<CINR_MCS14 |
| 15 | CINR_MCS14=<CINR<CINR_MCS15 |
| 16 | CINR_MCS15=<CINR<CINR_MCS16 |
| 17 | CINR_MCS16=<CINR<CINR_MCS17 |
| 18 | CINR_MCS17=<CINR<CINR_MCS18 |
| 19 | CINR_MCS18=<CINR<CINR_MCS19 |
| 20 | CINR_MCS19=<CINR<CINR_MCS20 |
| 21 | CINR_MCS20=<CINR<CINR_MCS21 |
| 22 | CINR_MCS21=<CINR<CINR_MCS22 |
| 23 | CINR_MCS22=<CINR<CINR_MCS23 |
| 24 | CINR_MCS23=<CINR<CINR_MCS24 |
| 25 | CINR_MCS24=<CINR<CINR_MCS25 |
| 26 | CINR_MCS25=<CINR<CINR_MCS26 |
| 27 | CINR_MCS26=<CINR<CINR_MCS27 |
| 28 | CINR_MCS27=<CINR |

(i=0, 1, . . . , 27) are CINRs with a Block Error Ratio (BLER) of 10%, which are obtained via simulation on a BLER curve under 28 MCSs of an Additive white Gaussian noise (AWGN) channel.

MCS initial values of MCSinit0, MCSinit1, MCSinit2 and MCSinit3 corresponding to the case of a single code stream can be obtained from Table 2; and MCS initial values of {MCSinit11 MCSinit12} and {MCSinit21 MCSinit22} corresponding to the case of double code streams can be obtained from Table 2.

Step 103: filtering the MCSinits.

The filtering is performed according to the following way:
if the MCSinits after mapping are the same, then selecting any one of the MCSinits;
if the MCSinits after mapping are different, then the MCSinits are filtered according to the following way:
in the case of a single data stream, selecting an MCSinit which corresponds to a higher CINR;
in the case of double data streams, selecting an MCSinit which corresponds to a higher sum of CINRs, and if the sums of the CINRs are equal, then selecting an MCSinit in which there is a smaller difference between corresponding CINRs.

In addition, in the case that multiple PMI throughputs or multiple spectral efficiencies are the same, an MCSinit with a smaller RI is preferentially selected; if the RIs are the same and RI=1, then an MCSinit with a larger CINR is selected; if RI is larger than 1, then an MCSinit in which there is a smaller difference between CINRs of two code streams is preferentially selected; and if all CINR differences of two code streams are the same, then any one of the MCSinits is selected.

In the present embodiment, there are 6 groups of MCSinits, which are MCSinit0, MCSinit1, MCSinit2, MCSinit3, {MCSinit11, MCSinit12}, and {MCSinit21, MCSinit22}, respectively. First, a largest MCSinit is selected from the single code stream and is recorded as MCS1. Then a largest MCSinit is selected from the double code streams: if the two groups of data, {MCSinit11, MCSinit12}, and {MCSinit21, MCSinit22}, are the same, either one is selected; if they are different, the sums of their corresponding CINRs are compared, i.e. after comparing CINR11+CINR12 and CINR21+CINR22, the group with a larger sum is selected; if CINR11+CINR12 is equal to CINR21+CINR22, the group in which there is a smaller difference between the CINRs is selected and recorded as MCS2. To facilitate description, it is assumed that the MCSinits obtained through the filtering are {MCSinit11, MCSinit12}. The spectral efficiency corresponding to MCS1 is compared with the sum of the spectral efficiencies corresponding to the two code streams of MCS2. If the spectral efficiency corresponding to MCS1 is larger than that corresponding to MCS2, then RI=1; otherwise, RI=2.

In the present embodiment, to facilitate description, it is assumed that the MCSinits obtained through the filtering are {MCSinit11, MCSinit12}.

Step 104: determining an initial value of ΔMCS, a maximum value of ΔMCS, a minimum value of ΔMCS, an upper limit value of BLER and a lower limit value of BLER.

The initial value of ΔMCS is 0.

The maximum value of ΔMCS, the minimum value of ΔMCS, the upper limit value of BLER and the lower limit value of BLER are obtained according to experience.

Step 105: if the BLER is lower than the lower limit value for N consecutive times, then 1 is added to ΔMCS but ΔMCS should not exceed the determined maximum value of ΔMCS; if the BLER is higher than the upper limit value for M consecutive times, then 1 is deducted from ΔMCS but ΔMCS should not be smaller than the determined minimum value of ΔMCS; in other cases, ΔMCS remains unchanged.

The times N can be determined based on an empirical value.

Step 106: adding up ΔMCS and the MCSinit to obtain a modified MCS, wherein the range of the MCS is restricted within a range specified in an LTE protocol.

Step 107: calculating a spectral efficiency corresponding to the MCS, selecting a pre-coding matrix with a largest spectral efficiency, converting the MCS into a Channel Quality Indicator (CQI), and recording an RI corresponding to the selected pre-coding matrix.

The spectral efficiency is an effective number of bits transmitted on each subcarrier.

Step 108: reporting a CQI and a PMI corresponding to the selected pre-coding matrix and an RI of the channel matrix.

There is a mapping relation between the CQI and the MCS, and different frame configurations will result in different mapping values.

Under the same modulation mode, the greater the MCS, the spectral efficiency and the CQI are, the better the channel quality is, the larger the system throughput is and the larger the gain is.

Figure 2:
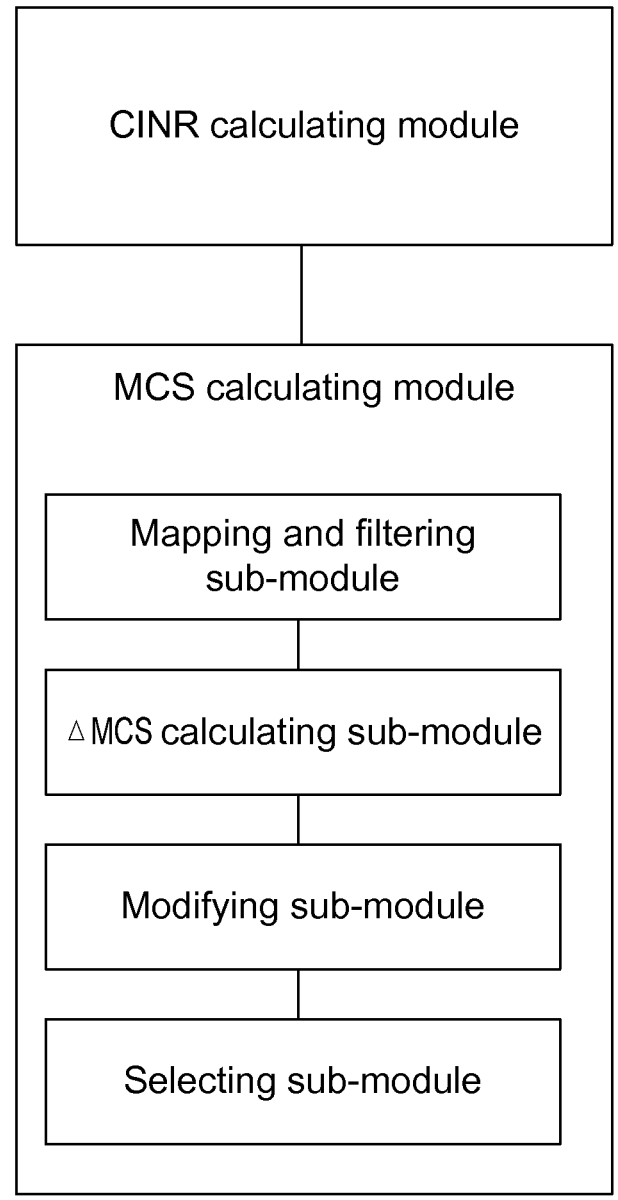
FIG. 2 exemplarily illustrates a system diagram of the present disclosure.

As shown in FIG. 2, in an embodiment of a system for selecting a pre-coding matrix in a closed loop MIMO system according to the present disclosure, a CINR calculating module and an MCS calculating module are included. The CINR calculating module is configured to traverse all pre-coding matrices and respectively calculate CINRs corresponding to all the pre-coding matrices. The MCS calculating module is configured to obtain an MCS according to a CINR corresponding to a pre-coding matrix, calculate a spectral efficiency corresponding to the MCS, and select a pre-coding matrix with a largest spectral efficiency.

In an embodiment of the system for selecting a pre-coding matrix in the closed loop MIMO system of the present disclosure, the MCS calculating module includes a mapping and filtering sub-module, a ΔMCS calculating sub-module, a modifying sub-module and a selecting sub-module. The mapping and filtering sub-module is configured to, according to a CINR-MCSinit mapping relation table, map CINRs to MCSinits and filter the MCSinits. The ΔMCS calculating sub-module is configured to calculate a modification value ΔMCS of a selected MCSinit. The modifying sub-module is configured to modify the filtered MCSinit with the modification value ΔMCS to obtain an MCS. The selecting sub-module is configured to calculate a spectral efficiency corresponding to the MCS and select the pre-coding matrix with the largest spectral efficiency.

In an embodiment of the system for selecting a pre-coding matrix in the closed loop MIMO system of the present disclosure, a reporting sub-module is further included and configured to report a CQI, a PMI and an RI corresponding to the pre-coding matrix with the largest spectral efficiency.

In an embodiment of the system for selecting a pre-coding matrix in the closed loop MIMO system of the present disclosure, the mapping and filtering sub-module is further configured to: if the MCSinits after mapping are the same, select any one of the MCSinits; and if the MCSinits after mapping are different, in the case of a single data stream, select an MCSinit which corresponds to a higher CINR, while in the case of double data streams, select an MCSinit which corresponds to a higher sum of CINRs, and if the sums of the CINRs corresponding to the MCSinit are equal, select an MCSinit in which there is a smaller difference between corresponding CINRs.

The present disclosure calculates a CINR of a pre-coding matrix to obtain an MCS, and then calculates a corresponding spectral efficiency so as to select an appropriate pre-coding matrix. By using the pre-coding matrix in the closed loop multi-input multi-output system, the channel quality, the throughput of a closed loop multiplexing system in the scenario that the channel changes slowly, and the gain can be improved. Besides, the method of the present disclosure can avoid calculation of the BER formula on the premise of a large number of assumptions, and reduce the computation complexity. The present disclosure obtains a CQI and an RI when obtaining the pre-coding matrix, thus saving system resources.

The contents above are further detailed descriptions for the present disclosure in combination with the preferred embodiments, which are only examples to facilitate understanding and it should not be considered that specific implementation of the present disclosure is limited by these descriptions. For those of ordinary skill in the art, there may be various possible equivalent changes or replacements without departing from the conception of the present disclosure, and these changes or replacements shall belong to the protection scope of the present disclosure.

The invention claimed is:

1. A method for selecting a pre-coding matrix in a closed loop Multi-Input Multi-Output (MIMO) system, comprising
   (A) traversing all pre-coding matrices and respectively calculating a Carrier to Interference Noise Ratio (CINR) corresponding to each pre-coding matrix;
   (B) obtaining a Modulation Coding Scheme (MCS) according to a CINR corresponding to a pre-coding matrix, calculating a spectral efficiency corresponding to the MCS, and selecting a pre-coding matrix with a largest spectral efficiency,
   wherein the Step B comprises:
   (B1) mapping CINRs to MCS initial values (MCSinits) according to a CINR-MCSinit mapping relation table, and filtering the MCSinits;
   (B2) calculating a modification value ΔMCS of a filtered MCSinit;
   (B3) modifying the filtered MCSinit with the modification value ΔMCS to obtain the MCS;
   (B4) calculating the spectral efficiency corresponding to the MCS, selecting the pre-coding matrix with the largest spectral efficiency, converting the MCS into a corresponding Channel Quality Indicator (CQI), and recording a Rank (RI) corresponding to the selected pre-coding matrix.

2. The method according to claim 1, further comprising: after the Step B4,
   reporting the CQI, a Pre-coding Matrix Indicator (PMI) and the RI corresponding to the pre-coding matrix with the largest spectral efficiency.

3. The method according to claim 2, wherein in the Step B1, the MCSinits are filtered according to the following way:
   if the MCSinits after mapping are the same, then selecting any one of the MCSinits;
   if the MCSinits after mapping are different, then the MCSinits are filtered according to the following way:
      in the case of a single data stream, selecting an MCSinit which corresponds to a higher CINR;
      in the case of double data streams, selecting an MCSinit which corresponds to a higher sum of CINRs, and if the sums of the CINRs corresponding to the MCSinit are equal, then selecting an MCSinit in which there is a smaller difference between corresponding CINRs.

4. The method according to claim 3, wherein filtering the MCSinits in the Step B1 further comprises:
in the case that multiple PMI throughputs or multiple spectral efficiencies are the same, selecting an MCSinit with a smaller RI preferentially; if RIs are the same and RI=1, then selecting an MCSinit with a larger CINR; if RI is larger than 1, then selecting an MCSinit in which there is a smaller difference between CINRs of two code streams preferentially; and if all CINR differences of the two code streams are the same, then selecting any one of the MCSinits.

5. The method according to claim 4, wherein the modification value $\Delta MCS$ in the Step B2 is obtained according to the following way:
(B21) determining an initial value of $\Delta MCS$, a maximum value of $\Delta MCS$, a minimum value of $\Delta MCS$, an upper limit value of Block Error Rate (BLER) and a lower limit value of BLER;
(B22) if the BLER is lower than the lower limit value for N consecutive times, then adding 1 to $\Delta MCS$, wherein the $\Delta MCS$ does not exceed the determined maximum value of $\Delta MCS$; if the BLER is higher than the upper limit value for M consecutive times, then deducting 1 from $\Delta MCS$, wherein $\Delta MCS$ is not smaller than the determined minimum value of $\Delta MCS$; in other cases, $\Delta MCS$ remains unchanged,
wherein the N and M are preset integers that represent calculate times.

6. The method according to claim 5, the modified MCS in the Step B3 is calculated according to the following way: adding up the $\Delta MCS$ and the MCSinit, wherein a range of the MCS is restricted within a range specified in an Long Term Evolution (LTE) protocol.

7. A system for selecting a pre-coding matrix in a closed loop Multi-Input Multi-Output (MIMO) system, comprising: a Carrier to Interference Noise Ratio (CINR) calculating module and a Modulation Coding Scheme (MCS) calculating module, wherein
the CINR calculating module is configured to traverse all pre-coding matrices and respectively calculate a CINR corresponding to each pre-coding matrix;
the MCS calculating module is configured to obtain an MCS according to the CINR corresponding to the pre-coding matrix, calculate a spectral efficiency corresponding to the MCS, and select a pre-coding matrix with a largest spectral efficiency,
wherein the MCS calculating module comprises a mapping and filtering sub-module, a $\Delta MCS$ calculating sub-module, a modifying sub-module and a selecting sub-module, wherein
the mapping and filtering sub-module is configured to, according to a CINR-MCSinit mapping relation table, map CINRs to MCS initial values (MCSinits) and filter the MCSinits;
the $\Delta MCS$ calculating sub-module is configured to calculate a modification value $\Delta MCS$ of a filtered MCSinit;
the modifying sub-module is configured to modify the filtered MCSinit with $\Delta MCS$ to obtain the MCS;
the selecting sub-module is configured to calculate the spectral efficiency corresponding to the MCS, select the pre-coding matrix with the largest spectral efficiency, convert the MCS into a corresponding Channel Quality Indicator (CQI), and record a Rank (RI) corresponding to the selected pre-coding matrix.

8. The system according to claim 7, wherein the MCS calculating module further comprises a reporting sub-module configured to report the CQI, a Pre-coding Matrix Indicator (PMI) and the RI corresponding to the pre-coding matrix with the largest spectral efficiency.

9. The system according to claim 8, wherein the mapping and filtering sub-module is further configured to: if the MCSinits after mapping are the same, select any one of the MCSinits; and
further configured to: if the MCSinits after mapping are different, in the case of a single data stream, select an MCSinit which corresponds to a higher CINR, while in the case of double data streams, select an MCSinit which corresponds to a higher sum of CINRs, and if the sums of the CINRs corresponding to the MCSinit are equal, select an MCSinit in which there is a smaller difference between corresponding CINRs.

10. The system according to claim 9, wherein the mapping and filtering sub-module is further configured to: in the case that multiple PMI throughputs or multiple spectral efficiencies are the same, select an MCSinit with a smaller RI preferentially; if RIs are the same and RI=1, select an MCSinit with a larger CINR; if RI is larger than 1, select an MCSinit in which there is a smaller difference between CINRs of two code streams preferentially; and if all CINR differences of the two code streams are the same, select any one of the MCSinits.

11. The system according to claim 10, wherein the modifying sub-module is further configured to: determine an initial value of $\Delta MCS$, a maximum value of $\Delta MCS$, a minimum value of $\Delta MCS$, an upper limit value of Block Error Rate (BLER) and a lower limit value of BLER;
if the BLER is lower than the lower limit value for N consecutive times, add 1 to $\Delta MCS$ and $\Delta MCS$ does not exceed the determined maximum value of $\Delta MCS$; if the BLER is higher than the upper limit value for M consecutive times, deduct 1 from $\Delta MCS$ and $\Delta MCS$ is not smaller than the determined minimum value of $\Delta MCS$; in other cases, $\Delta MCS$ remains unchanged,
wherein the N and M are preset integers that represent calculate times.

* * * * *